(12) United States Patent
Ionita et al.

(10) Patent No.: US 10,970,576 B2
(45) Date of Patent: Apr. 6, 2021

(54) METHODS AND SYSTEMS FOR CAPTURING IMAGE DATA

(71) Applicant: DAON HOLDINGS LIMITED, George Town (KY)

(72) Inventors: Mircea Ionita, Dublin (IE); Michael Peirce, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 0 days.

(21) Appl. No.: 16/112,864

(22) Filed: Aug. 27, 2018

(65) Prior Publication Data
US 2020/0065602 A1 Feb. 27, 2020

(51) Int. Cl.
| | | |
|---|---|---|
| H04N 5/232 | (2006.01) | |
| G06K 9/32 | (2006.01) | |
| G06T 7/70 | (2017.01) | |
| G06K 9/00 | (2006.01) | |

(52) U.S. Cl.
CPC ....... *G06K 9/3208* (2013.01); *G06K 9/00288* (2013.01); *G06T 7/70* (2017.01); *H04N 5/23219* (2013.01); *H04N 5/23222* (2013.01); G06T 2207/30201 (2013.01)

(58) Field of Classification Search
CPC ............ G06K 9/3208; G06K 9/00288; G06K 9/2081; G06K 9/22; G06K 9/00912; G06T 7/70; G06T 2207/30201; H04N 5/23219; H04N 5/23222; H04W 12/00522; G06F 21/32; H04L 63/0861
See application file for complete search history.

(56) References Cited

U.S. PATENT DOCUMENTS

| | | | | |
|---|---|---|---|---|
| 8,842,935 B2 | * | 9/2014 | Park | H04N 5/23293 382/293 |
| 9,813,693 B1 | * | 11/2017 | Baldwin | G06T 7/60 |
| 10,002,413 B2 | * | 6/2018 | Pollard | G06T 5/006 |
| 10,695,675 B2 | * | 6/2020 | Projansky | A63F 13/428 |
| 2005/0078200 A1 | * | 4/2005 | Morichika | H04N 1/387 348/231.99 |
| 2007/0065039 A1 | * | 3/2007 | Park | H04N 5/23218 382/275 |
| 2007/0113099 A1 | * | 5/2007 | Takikawa | G06K 9/00221 713/186 |

(Continued)

FOREIGN PATENT DOCUMENTS

EP    3 282 390 A1    2/2018

OTHER PUBLICATIONS

Extended European Search Report for EPO counterpart application No. 19188319.8, dated Dec. 13, 2019, pp. 1-7.

*Primary Examiner* — Shahbaz Nazrul
(74) *Attorney, Agent, or Firm* — Kevin McDermott, Esq.

(57) ABSTRACT

A method for capturing image data of a user is provided that includes displaying, by a computing device, a perspective view of a virtual computing device. Moreover, the method includes changing, by the computing device, the perspective view of the virtual computing device while the computing device moves, changing, by the computing device, the display of the virtual computing device to provide notification that the computing device is in an acceptable position for capturing image data of a user, and capturing, by a camera included in the computing device, facial image data of the user.

14 Claims, 7 Drawing Sheets

(56) References Cited

U.S. PATENT DOCUMENTS

| | | | |
|---|---|---|---|
| 2011/0149094 A1* | 6/2011 | Chen | H04N 5/23248 348/208.3 |
| 2011/0298829 A1* | 12/2011 | Stafford | G06K 9/00248 345/659 |
| 2011/0317031 A1* | 12/2011 | Honda | H04N 5/23219 348/229.1 |
| 2012/0033100 A1* | 2/2012 | Harikae | H04N 1/00307 348/223.1 |
| 2013/0002923 A1* | 1/2013 | Kanma | G01C 17/28 348/333.02 |
| 2014/0002494 A1* | 1/2014 | Cunningham | G09G 5/00 345/633 |
| 2014/0099003 A1* | 4/2014 | Langley | G06K 9/00255 382/115 |
| 2015/0095999 A1* | 4/2015 | Toth | H04L 63/08 726/6 |
| 2015/0358498 A1* | 12/2015 | Eom | H04N 1/2112 348/231.99 |
| 2016/0134803 A1* | 5/2016 | Deng | H04N 5/23222 348/222.1 |
| 2017/0169202 A1* | 6/2017 | Duggan | G06F 21/32 |
| 2018/0046853 A1* | 2/2018 | Ionita | G06K 9/6201 |
| 2019/0080189 A1* | 3/2019 | Van Os | H04N 5/23216 |
| 2019/0130171 A1* | 5/2019 | Alameh | G06K 9/00288 |
| 2019/0138791 A1* | 5/2019 | Wang | G06K 9/00248 |

* cited by examiner

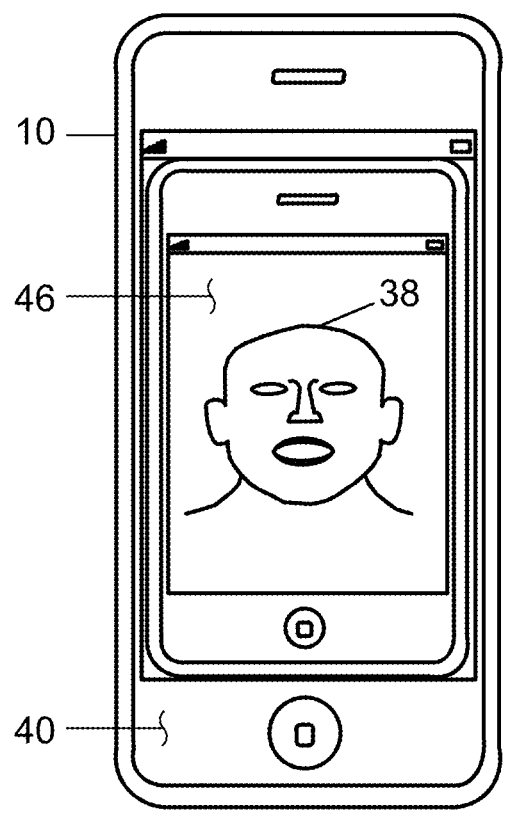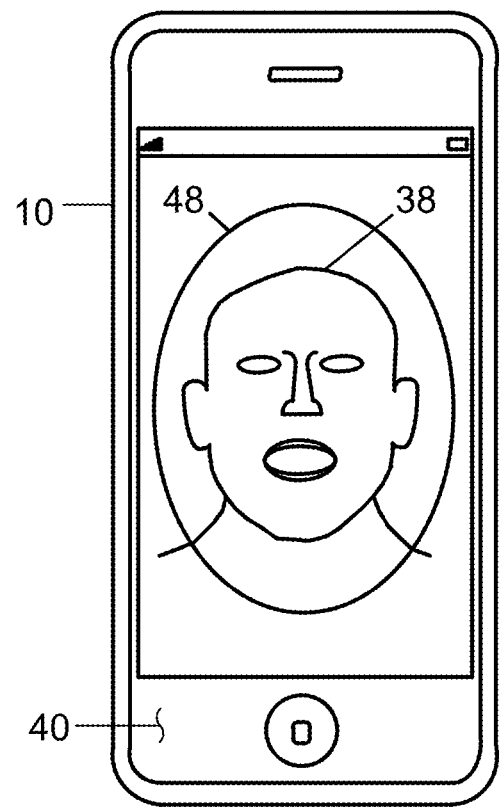
FIG. 6
FIG. 7

METHODS AND SYSTEMS FOR CAPTURING IMAGE DATA

BACKGROUND OF THE INVENTION

This invention relates generally to capturing image data, and more particularly, to methods and systems for capturing image data of a biometric modality of a user that is usable for generating trustworthy authentication transaction results.

Users conduct transactions with many different service providers in person and remotely over the Internet. Network-based transactions conducted over the Internet may involve purchasing items from a merchant web site or accessing confidential information from a web site. Service providers that own and operate such websites typically require successfully identifying users before allowing a desired transaction to be conducted.

Users are increasingly using smart devices to conduct such network-based transactions and to conduct network-based biometric authentication transactions. Some network-based biometric authentication transactions have more complex biometric data capture requirements which have been known to be more difficult for users to comply with. For example, some users have been known to position the smart device near their waist when capturing a facial image. Many users still look downwards even if the device is held somewhere above waist level. Such users typically do not appreciate that differently positioning the smart device should result in capturing better image data. Consequently, capturing image data of a biometric modality of such users that can be used for generating trustworthy authentication transaction results has been known to be difficult, annoying, and time consuming for users and authentication service providers. Additionally, obtaining such image data has been known to increase costs for authentication service providers.

BRIEF DESCRIPTION OF THE INVENTION

In one aspect, a method for capturing image data of a user is provided that includes displaying, by a computing device, a perspective view of a virtual computing device. Moreover, the method includes changing, by the computing device, the perspective view of the virtual computing device while the computing device moves, changing, by the computing device, the display of the virtual computing device to provide notification that the computing device is in an acceptable position for capturing image data of a user, and capturing, by a camera included in the computing device, facial image data of the user.

In another aspect, a computing device for capturing image data of a user is provided that includes a processor and a memory. The memory is configured to store data and the computing device is associated with a network. The memory is in communication with the processor and has instructions stored thereon which, when read and executed by the processor, cause the computing device to display a perspective view of a virtual computing device. Moreover, the instructions when read and executed by the processor cause the computing device to change the perspective view of the virtual computing device while the computing device moves, change the display of the virtual computing device to provide notification that the computing device is in an acceptable position for capturing image data of a user, and capture, by a camera included in the computing device, facial image data of the user.

BRIEF DESCRIPTION OF THE DRAWINGS

FIG. 6 is an enlarged front view of the computing device displaying the entire virtual computing device when the computing device is in an acceptable position;

FIG. 7 is an enlarged front view of the computing device displaying an example visual aid and an image of the user within the visual aid.

DETAILED DESCRIPTION OF THE INVENTION

Figure 1:
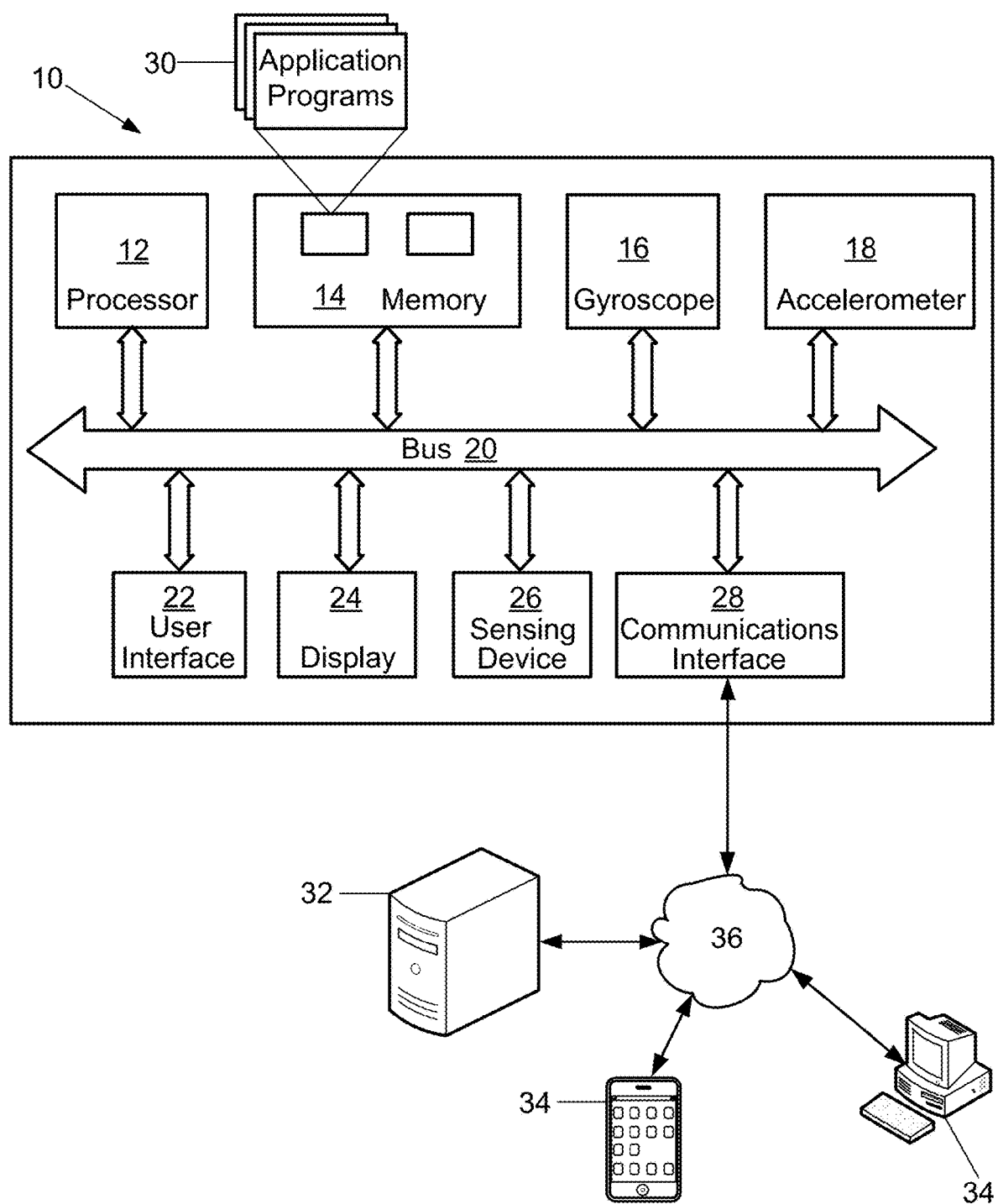
FIG. 1 is a diagram of an example computing device used for capturing image data of a biometric modality of a user.

FIG. 1 is a diagram of an example computing device 10 that may be used for capturing image data of a biometric modality of a user. The computing device 10 includes components such as, but not limited to, one or more processors 12, a memory 14, a gyroscope 16, one or more accelerometers 18, a bus 20, a user interface 22, a display 24, a sensing device 26 and a communications interface 28. General communication between the components in the computing device 10 is provided via the bus 20.

The computing device 10 may be any device capable of at least capturing image data of users, processing the image data, and performing the functions described herein. One example of the computing device 10 is a smart phone. Other examples of the computing device 10 include, but are not limited to, a cellular phone, a tablet computer, a phablet computer, a laptop computer, a personal computer (PC), and any type of device having wired or wireless networking capabilities such as a personal digital assistant (PDA).

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the computing device 10 to perform at least a portion of the functions and/or methods described herein. Application programs 30, also known as applications, are computer programs stored in the memory 14. Application programs 30 include, but are not limited to, an operating system, an Internet browser application, authentication applications, and any special computer program that manages the relationship between application software and any suitable variety of hardware that helps to make-up a computer system or computing environment.

Authentication applications enable the computing device 10 to conduct user verification and identification transactions with any type of authentication data. The process of verifying the identity of a user is referred to as a verification transaction. Typically, during a verification transaction a biometric template is generated from image data of the user captured during the transaction. The generated biometric template is compared against a user record biometric template for the same biometric modality, and if the generated and record templates match the identity of the user is verified as true. Alternatively, the captured image data itself may be compared against the record user biometric data to verify the identity of the user. The trustworthiness of authentication transaction results depends on the quality of the captured image data.

The memory 14 may be any non-transitory computer-readable recording medium used to store data including, but not limited to, computer programs and user data records. The data record for each user may include record biometric data, record biometric templates and personal data of the user. The record biometric data may be a digital image processed to generate at least one record biometric template. The record biometric template may be used to verify the identity of a user.

Personal data includes any demographic information regarding a user such as, but not limited to, a user's name, gender, age, date-of-birth, address, citizenship and marital status. Each data record may also include any kind of data that may be used to enhance the trustworthiness of user liveness detection results and authentication transaction results. The data records are typically for users associated with the computing device 10.

Configurable policies for determining record data requirements and authentication data requirements, respectively, may also be stored in the memory 14. A record data requirement is the data desired to be captured from a user and stored in the user's data record prior to conducting authentication transactions for the user. An authentication data requirement is the data desired to be captured from a user during either a verification or identification transaction. The record and authentication data requirements may be for any type of authentication data, for example, image data of a biometric modality, illumination data during capture of image data, position information of the computing device 10 during capture of image data, and any other data that may be captured by the components of the computing device 10. Image data may be of any biometric modality including, but not limited to, face, finger, iris, and palm, and any combination of these or other biometric modalities. Moreover, image data may be a single digital or non-digital image, a plurality of images, or a continuous sequence of frames in a video. Each frame includes image data, illumination data, position data and any other data that may be captured by the components of the computing device 10. For the example methods described herein, the authentication data requirement is for facial image data.

The record and authentication data requirements may be determined in any manner, including by an individual and by any system 32 or device 34 configured to communicate with the computing device 10 over a network 36.

Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The gyroscope 16 and the accelerometer 18 generate data regarding rotation and translation of the computing device 10 that may be communicated to the processor 12 and the memory 14 via the bus 20. The processor 12 may use the generated data to at least calculate the acceleration of the computing device 10, calculate the orientation and position of the computing device 10, and calculate parameters.

The user interface 22 and the display 24 allow interaction between a user and the computing device 10. The display 24 may include a visual display or monitor that displays information to a user. For example, the display 24 may be a Liquid Crystal Display (LCD), active matrix display, plasma display, or cathode ray tube (CRT). The user interface 22 may include a keypad, a keyboard, a mouse, an infrared light source, a microphone, cameras, and/or speakers. Moreover, the user interface 22 and the display 24 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 10 to enter data, change settings, control functions, etc. Consequently, when the touch screen is touched, the user interface 22 communicates this change to the processor 12, and settings can be changed or user entered information can be captured and stored in the memory 14.

The sensing device 26 may include Radio Frequency Identification (RFID) components or systems for receiving information from other devices. The sensing device 26 may also include components with Bluetooth, Near Field Communication (NFC), infrared, or other similar capabilities. The computing device 10 may alternatively not include the sensing device 26.

The communications interface 28 provides the computing device 10 with two-way data communications. Moreover, the communications interface 28 enables the computing device 10 to conduct wireless communications such as cellular telephone calls and to wirelessly access the Internet over the network 36. By way of example, the communications interface 28 may be a digital subscriber line (DSL) card or modem, an integrated services digital network (ISDN) card, a cable modem, or a telephone modem to provide a data communication connection to a corresponding type of telephone line. As another example, the communications interface 28 may be a local area network (LAN) card (e.g., for Ethernet™ or an Asynchronous Transfer Model (ATM) network) to provide a data communication connection to a compatible LAN. As yet another example, the communications interface 28 may be a wire or a cable connecting the computing device 10 with a LAN, or with accessories such as, but not limited to, biometric capture devices. Further, the communications interface 28 may include peripheral interface devices, such as a Universal Serial Bus (USB) interface, a PCMCIA (Personal Computer Memory Card International Association) interface, and the like. Thus, it should be understood the communications interface 28 may enable the computing device 10 to conduct any type of wireless or wired communications such as, but not limited to, accessing the Internet. Although the computing device 10 includes a single communications interface 28, the computing device 10 may alternatively include multiple communications interfaces 28.

The communications interface 28 also allows the exchange of information across the network 36. The exchange of information may involve the transmission of radio frequency (RF) signals through an antenna (not shown). Moreover, the exchange of information may be between the computing device 10 and any other computer systems 32 and any other computing devices 34 capable of communicating over the network 36. The computer systems 32 and the computing devices 34 typically include components similar to the components included in the computing device 10. The network 36 may be a 5G communications network. Alternatively, the network 36 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 36 may also be any type of wired network or a combination of wired and wireless networks.

Examples of other computer systems 32 include computer systems of service providers such as, but not limited to, financial institutions, medical facilities, national security agencies, merchants, and authenticators. Examples of other computing devices 34 include, but are not limited to, smart phones, tablet computers, phablet computers, laptop computers, personal computers and cellular phones. The other computing devices 34 may be associated with any individual or with any type of entity including, but not limited to, commercial and non-commercial entities. The computing devices 10, 34 may alternatively be referred to as computer systems or information systems, while the computer systems 32 may alternatively be referred to as computing devices or information systems.

While attempting to capture image data, users 38 aim the computing device 10 such that an image of his or her face is displayed by the computing device 10. However, while aiming the computing device 10 at his or her self, users may not orient the computing device 10 to capture image data usable for generating trustworthy authentication transaction results.

Figure 2:
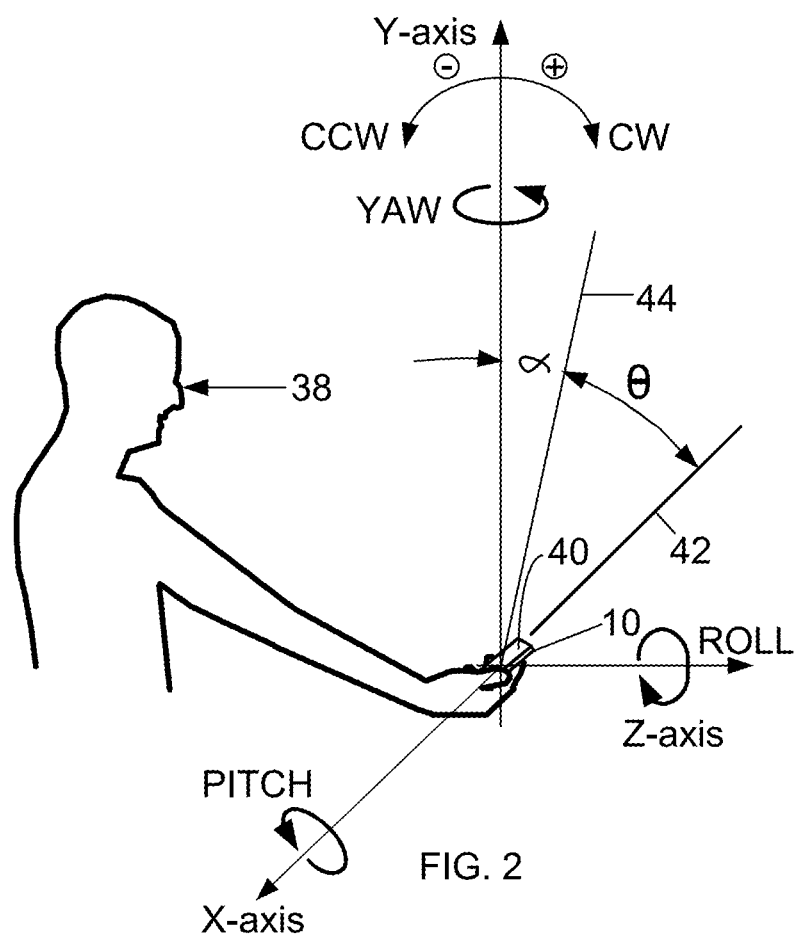
FIG. 2 is a side view of a user operating the computing device in which the computing device is in a first example position.

FIG. 2 is a side view of a person 38 operating the computing device 10 in which the computing device 10 is in a first example position. The first position is the position in which a person naturally holds the computing device 10 when aiming the device 10 at his or her self. Because people have different natural tendencies, the first position of the computing device 10 is typically different for different people.

The person from whom image data is captured is referred to herein as a user 38. The user 38 also typically operates the computing device 10 during capture. However, a person different than the user may operate the computing device 10 to capture image data of the user 38.

A three-dimensional Cartesian coordinate system having X, Y, and Z-axes may be virtually positioned in any location on the computing device 10 that enables accurately calculating parameters. The coordinate system represents the three-dimensional space through which the computing device 10 may freely move.

The computing device 10 may be rotated about any combination of the X, Y, and Z-axes, and may be translated along any combination of the X, Y, and Z-axes. Rotation of the computing device 10 about the X-axis is called pitch (i.e., pitch angle), rotation of the computing device 10 about the Y-axis is called yaw (i.e., yaw angle), and rotation of the computing device 10 about the Z-axis is called roll (i.e., roll angle). The computing device 10 may also be simultaneously rotated about and translated along any combination of the X, Y and Z-axes in any manner. Angles measured clockwise CW from the Y-axis, or any axis parallel to the Y-axis, are positive while angles measured counter clockwise CCW from the Y-axis, or any axis parallel to the Y-axis, are negative.

A front face 40 of the computing device 10 defines a plane 42. A reference plane 44 is offset from the Y-axis by a pitch angle alpha $\alpha$. The pitch angle $\alpha$ is between about ten and thirty degrees. Alternatively, the pitch angle $\alpha$ may be any angle that facilitates capturing image data usable for generating trustworthy authentication transaction results.

The planes 42 and 44 form a pitch angle theta $\theta$. The pitch angle theta $\theta$ represents the angle through which the computing device 10 should move to be in a best position for capturing image data of a biometric modality of a user that is usable for generating trustworthy authentication transaction results. The pitch angle theta $\theta$ is measured with respect to the reference plane 44. The pitch angle theta $\theta$ is positive if measured clockwise with respect to the plane 44 and is negative if measured counter clockwise with respect to the plane 44. The computing device 10 is in the best position when the planes 42 and 44 coincide.

In the first position, the angles $\alpha$ and $\theta$ typically are different and the planes 42 and 44 typically do not coincide. The angles $\alpha$ and $\theta$ as well as the planes 42 and 44 are examples of parameters that may be calculated by the computing device 10. The computing device 10 may calculate the angles $\alpha$ and $\theta$ for a frame from, for example, the image data for that frame. Alternatively, or additionally, the illumination data for the frame and data generated by the accelerometer 18 and the gyroscope 16 for the frame may be used to calculate the angles $\alpha$ and $\theta$.

Figure 2A:
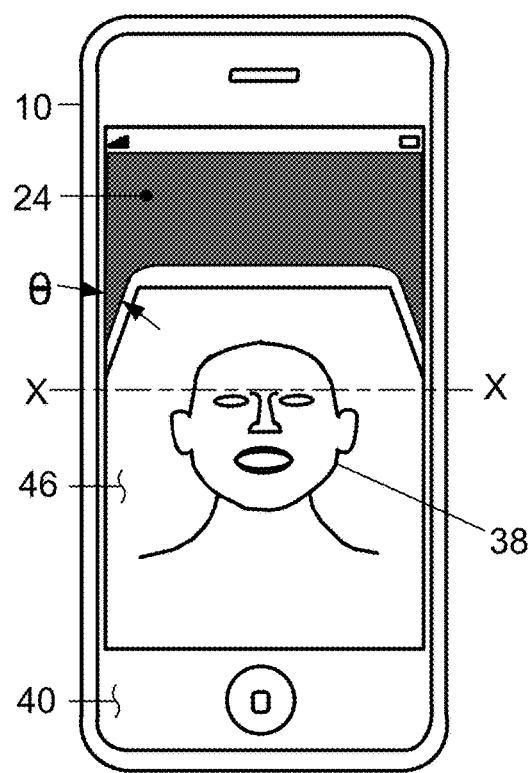
FIG. 2A is an enlarged front view of the computing device in the first position displaying a perspective view of an example virtual computing device in the virtual domain.

FIG. 2A is an enlarged front view of the computing device 10 in the first position displaying a perspective view of an example virtual computing device 46 in the virtual domain. The virtual computing device 46 is a virtual representation of the computing device 10. The virtual computing device 46 includes a virtual display region which illustrates a perspective view of the facial image of the user 38. The perspective view of the facial image of the user 38 is as captured by the computing device 10 in the first position. The virtual computing device 46 may alternatively illustrate the facial image of the user 38 as a front view or not at all. Moreover, the virtual computing device 46 may alternatively include the display region only, with or without the facial image of the user 38. The virtual computing device 46 appears to be tilted in three dimensions with respect to the front face 40.

Figure 3:
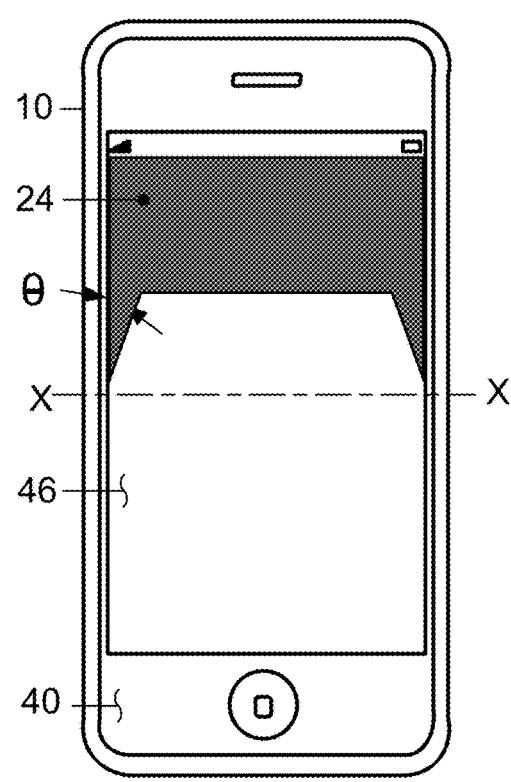
FIG. 3 is an enlarged front view of the computing device in the first position displaying a display region only of the virtual computing device.

The information shown in FIG. 3 is the same information shown in FIG. 2A as described in more detail below. As such, features illustrated in FIG. 3 that are identical to features illustrated in FIG. 2A are identified using the same reference numerals used in FIG. 2A.

FIG. 3 is an enlarged front view of the computing device 10 in the first position displaying the virtual computing device 46 as shown in FIG. 2A. However, the virtual display region only of the virtual computing device 46 is shown. An image of the user 38 is not shown.

Users may not be aware that image data usable for generating trustworthy authentication transaction results typically is not captured in the first position. Consequently, the computing device 10 displays the virtual computing device 46 to notify users that the computing device 10 should be moved and to prompt users into moving the computing device 10 into or towards the best position.

For the example methods and systems described herein, the virtual X-axis passes through a center of the computing device 10 and the computing device 10 is rotated about the X-axis. However, in alternative example methods and systems the virtual X-axis may be positioned in any manner with respect to the computing device 10. For example, the X-axis may extend along a top or bottom of the computing device 10.

For the example methods and systems described herein, the tilt of the virtual computing device 46 with respect to the face 40 equals the angle theta $\theta$. Moreover, the tilt of the virtual computing device 46 is synchronized with changes in the angle theta $\theta$. Consequently, as the angle theta $\theta$ changes, the tilt and thus the perspective view of the virtual computing device 46 also change. More specifically, as the angle theta $\theta$ increases, the tilt increases. Additionally, the difference between the display 24 and the perspective view of the virtual computing device 46 increases, the top of the virtual computing device 46 appears to rotate away from the user, and the bottom of the virtual computing device 46 appears to rotate towards the user. As the angle theta $\theta$ decreases, the tilt decreases. Moreover, the difference between the display 24 and the perspective view of the virtual computing device 46 decreases, the top of the virtual device 46 appears to rotate toward the user, and the bottom of the virtual computing device 46 appears to rotate away from the user.

Although the tilt of the virtual computing device 46 equals the pitch angle theta $\theta$ in the example methods and systems described herein, the virtual computing device 46 may alternatively be tilted with respect to the front face 40 of the computing device 10 using any parameter measured or calculated by the computing device 10. For example, the virtual computing device 46 may be tilted with respect to the front face 40 of the computing device 10 by a yaw or roll angle, or any combination of yaw, pitch and roll angles.

A text message may alternatively, or additionally, be displayed by the computing device 10 to prompt users 38 into moving the computing device 10 into or towards the best position. For example, the message may instruct the user to "Hold Device At Correct Angle," or "Hold Device Upright." Any message that facilitates causing users to move the computing device 10 into or towards the best position may be used. One or more arrows may also be displayed by the computing device 10 to prompt users into moving the computing device 10 into or towards the best position.

As an alternative to, or in addition to, displaying the virtual computing device 46, a text message and/or an arrow, the computing device 10 may emit an audio message or a sound. The audio message may instruct the user regarding how to move the device 10 into the best position. The sound could be emitted in different tones, some of which indicate the device is moving towards or is in the best position and others which indicate the device is not moving towards the best position.

The virtual computing device 46 and the computing device display 24 are different colors. The virtual computing device 46 is primarily white while the computing device display 24 is black. Alternatively, the virtual computing device 46 and the display 24 may be any colors that enable distinguishing the two areas from each other.

Upon observing the virtual computing device 46, users intuitively understand that the computing device 10 is to be moved so the virtual computing device 46 moves on the display 24. Users also intuitively understand that the virtual computing device 46 can be used as a guide for moving the computing device 10 into an acceptable position.

Figure 4:
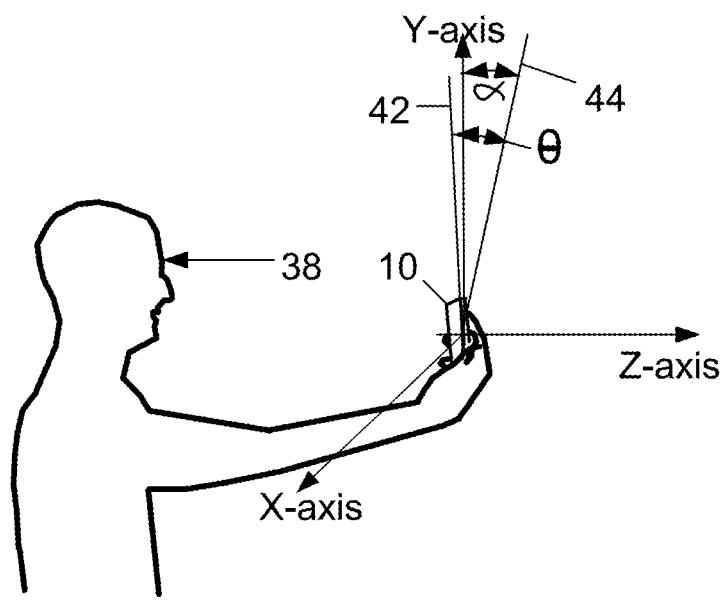
FIG. 4 is a side view of the user operating the computing device in which the computing device is in a second example position.

The information shown in FIG. 4 is the same information shown in FIG. 2 as described in more detail below. As such, features illustrated in FIG. 4 that are identical to features illustrated in FIG. 2 are identified using the same reference numerals used in FIG. 2.

FIG. 4 is a side view of the user 38 operating the computing device 10 in which the computing device 10 is in a second example position. In response to observing the virtual computing device 46 displayed by the computing device 10 in the first position, an attempt was made to move the computing device 10 into the best position. However, the computing device 10 is not in the best position. Moreover, the angle theta $\theta$ is negative so the plane 42 is on the opposite side of the plane 44 versus the first position.

It can be difficult to place the computing device 10 in the best position. Moreover, after placing the computing device in the best position users 38 may inadvertently slightly move or shake the computing device 10 so the computing device 10 moves out of the best position. Consequently, when the pitch angle theta $\theta$ is within a range of tolerances about the reference plane 44, the computing device 10 is considered to be in a position acceptable for capturing image data of a user that is usable for generating trustworthy authentication transaction results. An example range of tolerances for the angle theta $\theta$ is between about positive and negative ten degrees. At the outer range of the tolerances, users may also inadvertently move or shake the computing device 10 so the device 10 moves in and out of the range of tolerances and thus in and out of acceptable positions. As a result, the computing device 10 should be positioned well within the outside range of the tolerances to facilitate reducing movement in and out of acceptable positions. Well within the outside range of the tolerances may be between about two and three degrees. The range of tolerances for the angle theta $\theta$ may alternatively be any range that facilitates capturing image data usable for generating trustworthy authentication transaction results.

Figure 4A:
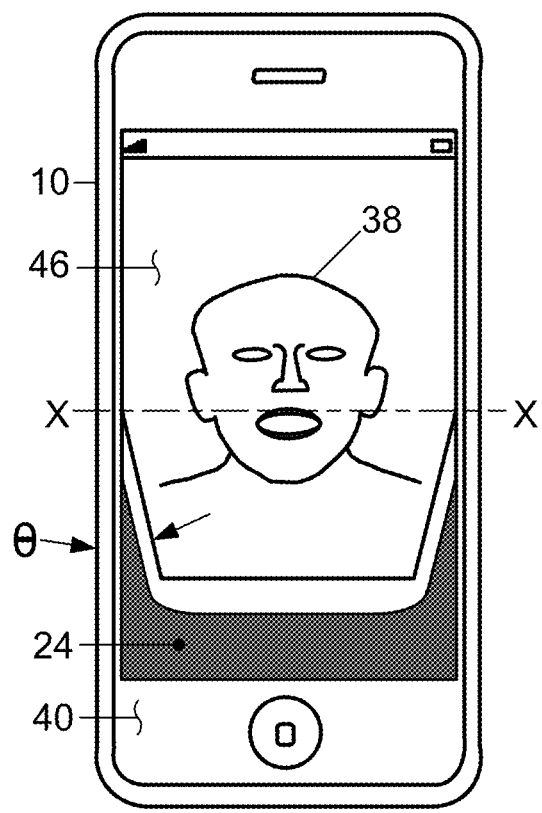
FIG. 4A is an enlarged front view of the computing device displaying the perspective view of the virtual computing device in the second position.

The information shown in FIG. 4A is the same information shown in FIG. 2A as described in more detail below. As such, features illustrated in FIG. 4A that are identical to features illustrated in FIG. 2A are identified using the same reference numerals used in FIG. 2A.

FIG. 4A is an enlarged front view of the computing device 10 in the second position displaying the perspective view of the virtual computing device 46. The angle theta $\theta$ is negative, so the virtual computing device 46 is tilted in a direction opposite to the tilt of the first position.

It should be understood that as the computing device 10 moves towards the best position, the angle theta θ approaches the range of tolerances about the reference plane 44 and the perspective view of the virtual computing device 46 changes accordingly. As soon as the angle theta θ is within the range of tolerances about the reference plane 44, the computing device 10 instantly ceases to display the virtual computing device 46 thus indicating to users that the computing device 10 is in an acceptable position. By thus instantly changing the display of the virtual computing device 46, the computing device 10 gives users the impression that the display region of the virtual computing device 46 is identical to the display 24 of the computing device 10. The computing device 10 remains in an acceptable position as long as the angle theta θ is within the range of tolerances. However, should the angle theta θ change to be outside the range of tolerances, the computing device 10 displays the virtual computing device 46 thus indicating to users that the computing device 10 is no longer in an acceptable position.

Alternatively, as soon as the angle theta θ is within the range of tolerances about the reference plane 44, the computing device 10 may instantly change the virtual computing device 46 such that the area and perimeter of the display region of the virtual computing device 46 match the area and perimeter of the computing device display 24, and such that the information displayed by the virtual device 46 and the device 10 overlaps. Such an instant change also gives users 38 the impression that the display of the virtual computing device 46 is identical to the display 24 of the computing device 10. Instead of displaying the display region of the virtual computing device 46 when the angle theta θ is within the range of tolerances, the computing device 10 may display the entire virtual computing device 46. Additionally, or alternatively, the computing device 10 may display a message, emit a positive sound, or both, indicating the computing device 10 is in an acceptable position for capturing image data that is usable for generating trustworthy authentication results.

Figure 5:
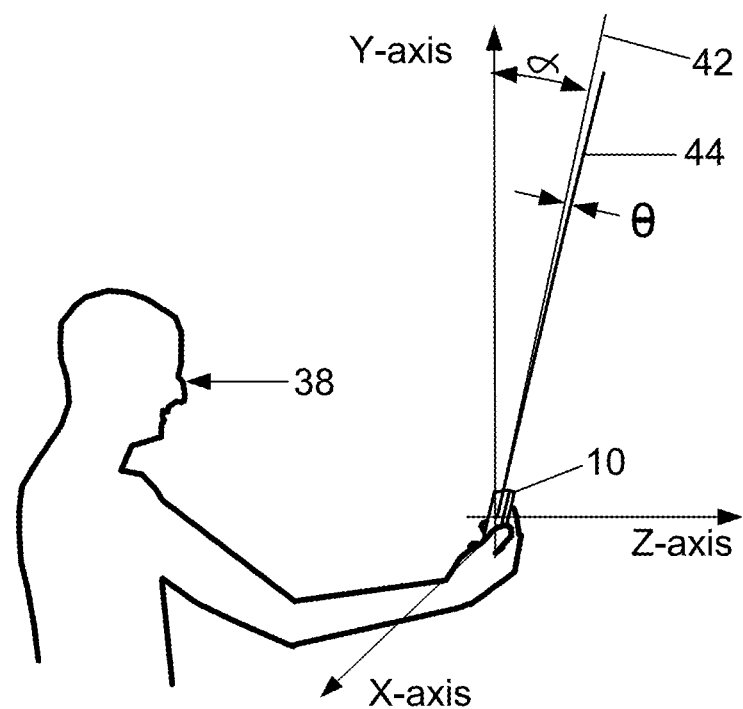
FIG. 5 is a side view of the user operating the computing device in which the computing device is in an example acceptable position for capturing image data.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is a side view of the user 38 operating the computing device 10 in an example acceptable position for capturing image data usable for generating trustworthy authentication transaction results. The angle theta θ is within the range of tolerances about the reference plane 44 so the virtual computing device 46 is in an acceptable position.

Figure 5A:
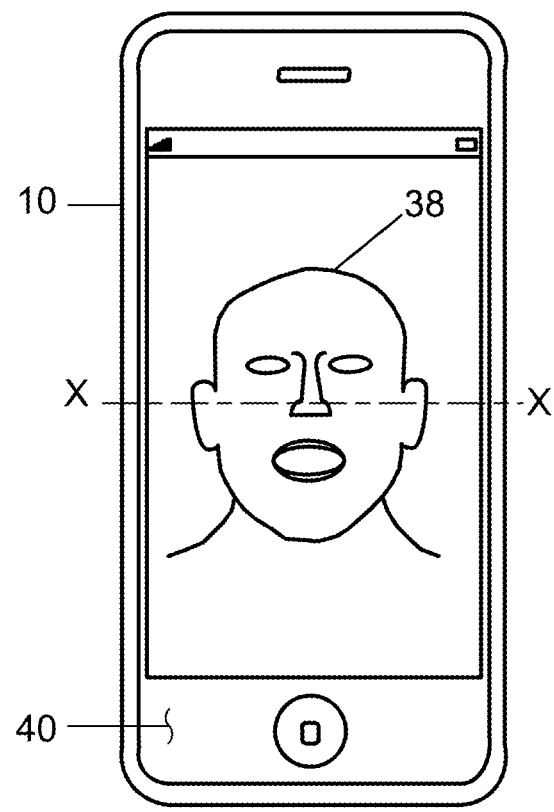
FIG. 5A is an enlarged front view of the computing device in the example acceptable position.

The information shown in FIG. 5A is the same information shown in FIG. 4A as described in more detail below. As such, features illustrated in FIG. 5A that are identical to features illustrated in FIG. 4A are identified using the same reference numerals used in FIG. 4A.

FIG. 5A is an enlarged front view of the computing device 10 in the example acceptable position. The virtual computing device 46 is not displayed by the computing device 10 which indicates to the user 38 that the computing device 10 is in an acceptable position. Additionally, a front view of the user's facial image is displayed by the computing device 10.

FIG. 6 is an enlarged front view of the computing device 10 displaying the entire virtual computing device 46 when the computing device 10 is in an acceptable position.

Changes in the tilt and perspective view of the virtual computing device 46 constitute real time feedback to users 38 which enables users 38 to move the computing device 10 into an acceptable position. Moreover, by suddenly ceasing to display the virtual computing device 46 the computing device 10 notifies users 38 in real time that the computing device 10 is in an acceptable position for capturing image data. Thus, the virtual computing device 46 functions as a guide that enables users to move the computing device 10 into an acceptable position and as a real time notification to users that facilitates capturing image data usable for generating trustworthy authentication transaction results. The computing device 10 uses measured and calculated parameters to determine the tilt and the perspective view of the virtual computing device 46.

FIG. 7 is an enlarged front view of the computing device 10 displaying an example visual aid 48 and a facial image of the user 38 positioned within the visual aid 48. The visual aid 48 may be displayed by the computing device 10 and functions as a guide that further enables users to position themselves with respect to the computing device 10 such that image data of the user may be captured that is usable for generating trustworthy authentication transaction results. One example of the visual aid 48 is an oval. Other examples of the visual aid 48 include, but are not limited to, a circle, a square, a rectangle, and an outline of the head of the user. The displayed image of the user 38 is to be positioned within the visual aid 46 while capturing image data of the user. Image data captured of the user while the user's face is positioned within the visual aid 48 and while the computing device 10 is in an acceptable position is typically usable for generating trustworthy authentication transaction results.

Figure 8:
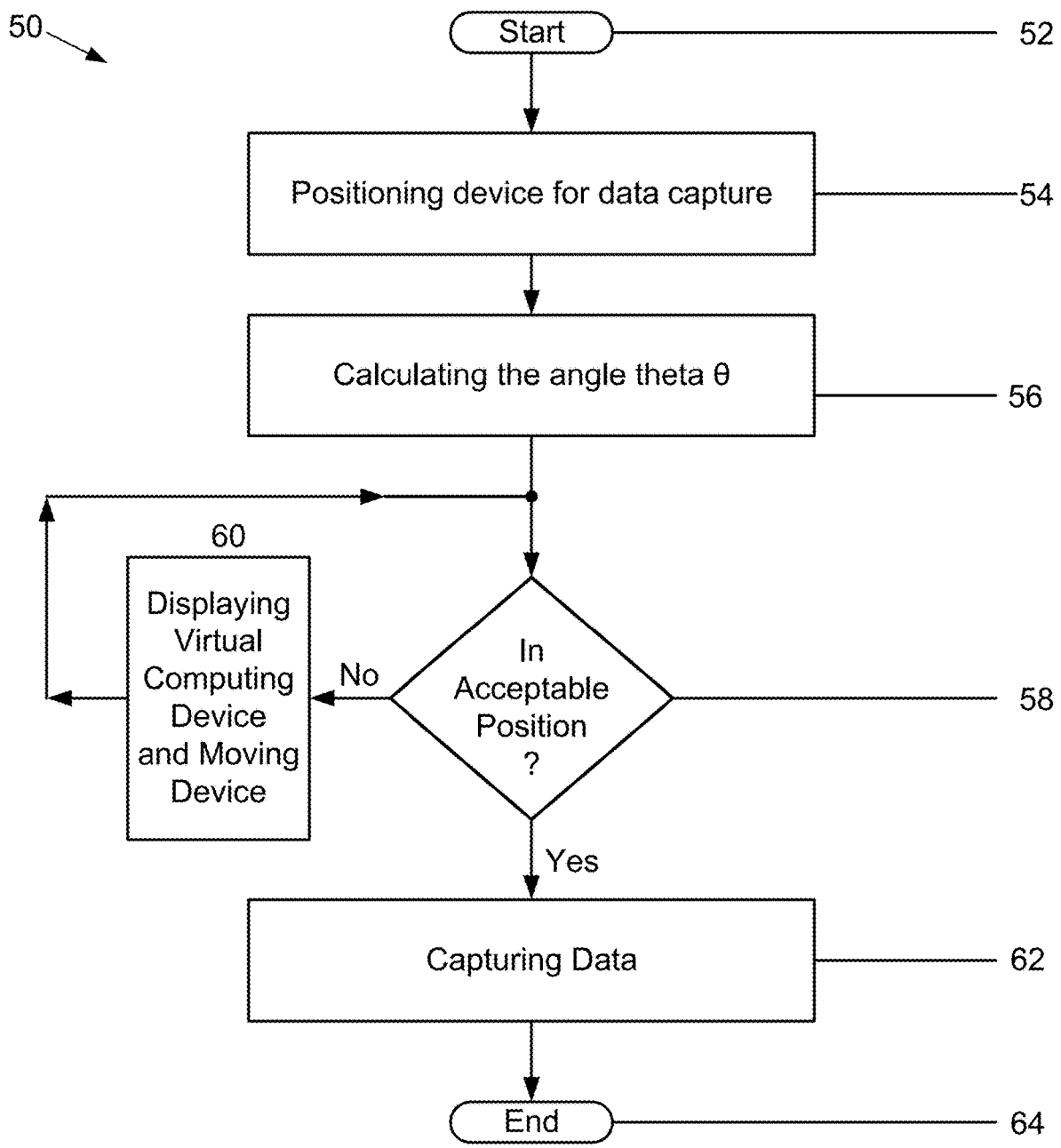
FIG. 8 is a flowchart illustrating an example method for capturing image data of a biometric modality of a user.

FIG. 8 is a flowchart 50 illustrating an example method for capturing image data of a biometric modality of a user. The process starts 52 when a user activates and positions 54 the computing device 10 in the first position to capture image data of his or her self. Next, processing continues by calculating 56 the angle theta θ and determining 58 whether or not the computing device 10 is in an acceptable position for capturing image data. If the angle theta θ is outside the range of tolerances about the reference plane 44, the computing device 10 is not in an acceptable position 58 and processing continues by displaying 60 the perspective view of the virtual computing device 46 on the computing device 10 and moving 60 the computing device 10 in response to the displayed virtual computing device 46.

While moving 60 the computing device 10, the user observes the displayed perspective view of the virtual computing device 46 and determines 58 whether or not the computing device 10 is in an acceptable position 58. When the virtual computing device 46 disappears from the computing device display 24, the computing device gives the user the impression that the display region of the virtual computing device 46 is identical to the computing device display 24. As a result, the user concludes that the computing device 10 is in an acceptable position and processing continues by capturing 62 facial image data of the user with the computing device 10. The user may cause the computing device 10 to capture image data or the computing device 10 may automatically do so. For example, the computing device 10 may capture image data automatically when the angle theta θ is within the range of tolerances. Next, processing ends 64.

When the image data is a continuous sequence of frames in a video, the example method is repeatedly executed while the video is being captured. Although the example method describes capturing facial image data of the user when the computing device 10 is in an acceptable position, in alternative example methods illumination data, position data of the computing device 10, and any other type of authentication data may additionally, or alternatively, be captured.

The example methods described herein may be conducted entirely by the computing device 10, or partly on the computing device 10 and partly on other computing devices 34 and computer systems 32 operable to communicate with the computing device 10. Moreover, the example methods described herein may be conducted entirely on the other computer systems 32 and other computing devices 34. Thus, the example methods may be conducted on any combination of computers, computer systems 32, and computing devices 34. Furthermore, data described herein as being stored in the memory 14 may alternatively be stored in any computer system 32 or computing device 34 operable to communicate with the computing device 10 over the network 36. Additionally, the example methods described herein may be implemented with any number and organization of computer program components. Thus, the methods described herein are not limited to specific computer-executable instructions. Alternative example methods may include different computer-executable instructions or components having more or less functionality than described herein.

In each example embodiment, the above-described methods and systems for capturing image data of users facilitates moving a computing device into an acceptable position for capturing image data usable for generating trustworthy authentication transaction results. More specifically, a user locates his or her computing device in a position to capture image data from his or her self. The computing device calculates the tilt of the computing device and whether or not the computing device is in an acceptable position for capturing image data. When the computing device is not in an acceptable position, the computing device displays a virtual computing device.

The tilt and perspective view of the virtual computing device change on the computing device display as the computing device moves. More specifically, as the computing device is moved towards the best position the tilt of the virtual computing device is reduced and the perspective view of the virtual computing device changes to more closely match the display of the computing device. When the computing device gives the user the impression that the display region of the virtual computing device is identical to the computing device display, the computing device is in an acceptable position for capturing image data usable for generating trustworthy authentication results. As a result, image data is facilitated to be captured more easily, quickly and conveniently, the costs of obtaining such image data are facilitated to be reduced, and authentication transactions are facilitated to be conducted more quickly and conveniently.

The example methods and systems for capturing image data of users described above should not be considered to imply a fixed order for performing the method steps. Rather, the method steps may be performed in any order that is practicable, including simultaneous performance of at least some steps. Moreover, the method steps may be performed in real time or in near real time. Furthermore, the invention is not limited to the embodiments of the methods described above in detail. Rather, other variations of the methods may be utilized within the spirit and scope of the claims.

What is claimed is:

1. A method for capturing image data of a user comprising the steps of:
    displaying, by a computing device, a perspective view of a virtual computing device;
    changing, by the computing device, the perspective view of the virtual computing device while the computing device moves;
    ceasing, by the computing device, to display the virtual computing device to provide notification that the computing device is in an acceptable position for capturing image data of a user; and
    capturing, by a camera included in the computing device, facial image data of the user.

2. The method for capturing image data of a user in accordance with claim 1, said displaying step further comprising displaying the virtual computing device at a tilt with respect to a front face of the computing device, the tilt matching an angle of a position of the computing device.

3. The method for capturing image data of a user in accordance with claim 1, further comprising the steps of:
    calculating an angle of a position of the computing device as the computing device moves; and
    capturing the facial image data when the angle is within a range of tolerances.

4. The method for capturing image data of a user in accordance with claim 3 wherein the angle is based on parameters measured and calculated by the computing device and is a combination of yaw, pitch, and roll angles.

5. A computing device for capturing image data of a user comprising:
    a processor; and
    a memory configured to store data, said computing device being associated with a network and said memory being in communication with said processor and having instructions stored thereon which, when read and executed by said processor, cause said computing device to:
    display a perspective view of a virtual computing device;
    change the perspective view of the virtual computing device while said computing device moves;
    cease displaying the virtual computing device to provide notification that said computing device is in an acceptable position for capturing image data of a user; and
    capture, by a camera included in said computing device, facial image data of the user.

6. The computing device for capturing image data of a user in accordance with claim 5 wherein the instructions when read and executed by said processor further cause said computing device to display the virtual computing device at a tilt with respect to a front face of said computing device, the tilt matching an angle of a position of said computing device.

7. The computing device for capturing image data of a user in accordance with claim 5 wherein the instructions when read and executed by said processor further cause said computing device to:
    calculate an angle of a position of said computing device as said computing device moves; and
    capture the facial image data when the angle is within a range of tolerances.

8. The computing device for capturing image data of a user in accordance with claim 7 wherein the angle is based on parameters measured and calculated by the computing device and is a combination of yaw, pitch, and roll angles.

9. The method for capturing image data of a user in accordance with claim 1, said displaying step further comprising displaying a virtual representation of the computing device as the virtual computing device.

10. The computing device for capturing image data of a user in accordance with claim 5 wherein the instructions when read and executed by said processor further cause said computing device to display the virtual computing device as a virtual representation of said computing device.

11. A non-transitory computer-readable recording medium in a computing device for capturing image data of a user, the non-transitory computer readable recording medium having one or more computer programs recorded thereon, which when read and executed by a hardware processor cause the non-transitory computer-readable recording medium to perform steps comprising:
  displaying a perspective view of a virtual computing device;
  changing the perspective view of the virtual computing device while the computing device moves;
  ceasing to display the virtual computing device to provide notification that the computing device is in an acceptable position for capturing image data of a user; and
  capturing facial image data of the user.

12. A non-transitory computer-readable recording medium according to claim 11, wherein the one or more computer programs, when read and executed by the hardware processor further cause the non-transitory computer-readable recording medium to perform steps comprising displaying the virtual computing device at a tilt with respect to a front face of the computing device, the tilt matching an angle of a position of the computing device.

13. A non-transitory computer-readable recording medium according to claim 11, wherein the one or more computer programs, when read and executed by the processor further cause the non-transitory computer-readable recording medium to perform steps comprising:
  calculating an angle of a position of the computing device as the computing device moves; and
  capturing the facial image data when the angle is within a range of tolerances.

14. A non-transitory computer-readable recording medium according to claim 13, wherein the angle is based a combination of yaw, pitch, and roll angles.

* * * * *